United States Patent [19]

Carter

[11] 4,041,445
[45] Aug. 9, 1977

[54] METHOD OF CONNECTING FLEXIBLE NUMBERS OF GEOPHONE FLYER GROUPS TO DATA ACQUISITION UNITS

[75] Inventor: Reid F. Carter, Houston, Tex.

[73] Assignee: Chevron Research Company, San Francisco, Calif.

[21] Appl. No.: 700,688

[22] Filed: June 28, 1976

[51] Int. Cl.² ............................................. G01V 1/22
[52] U.S. Cl. .................... 340/15.5 TS; 340/15.5 MC; 174/70 R
[58] Field of Search ............... 340/15.5 TS, 15.5 MC, 340/15.5 DP, 7 R; 174/70 R

[56] References Cited
U.S. PATENT DOCUMENTS

| | | | |
|---|---|---|---|
| 3,916,371 | 10/1975 | Broding | 340/15.5 MC |
| 3,930,145 | 12/1975 | Fort et al. | 340/15.5 TS |
| 3,938,073 | 2/1976 | Fort et al. | 340/15.5 TS |
| 4,001,769 | 1/1977 | Fort et al. | 340/15.5 TS |

Primary Examiner—Howard A. Birmiel
Attorney, Agent, or Firm—R. L. Freeland, Jr.; H. D. Messner

[57] ABSTRACT

The method utilizes a multiple-phone flyer-jumper connected to one channel of a series of channels of a remote data acquisition and telemetering circuit (RDATC). Each RDATC acts in combination with a group of geophone flyers, say 1, 2, 3, etc., to store, amplify, filter, gain control and digitize analog data from each group of flyers and then telemeter the data to recording circuitry in the field truck. Each flyer group can be flexibly made up of two, three, four or more flyer-jumpers; each flyer-jumper includes a central multi-conductor cable segment of say $N+1$ conductors, where N is an even positive number greater than two, terminating at each of its ends in the central leg of multi-armed connector. A plurality of series/parallel connected geophones, say nine in number are used in combination with the central segment. At the ends of the arms of each multi-armed connector pass another conductor cable segment (similar to the central segment, but called the "branch cable segment") in which only two of the cables are actively connected to the selected conductor pairs of the central segment. At the other end of each branch cable is a hermaphroditic connector including a 2 male-2 female combination, with connection occuring between 1 male-1 female subunit by paralleling them electrically. In that way the three geophone conductors of the central cable segment can be flexibly connected to 1, 2, 3, etc., or more similarly located connectors of other flyer-jumpers to increase signal response of the resulting flyer group.

4 Claims, 8 Drawing Figures

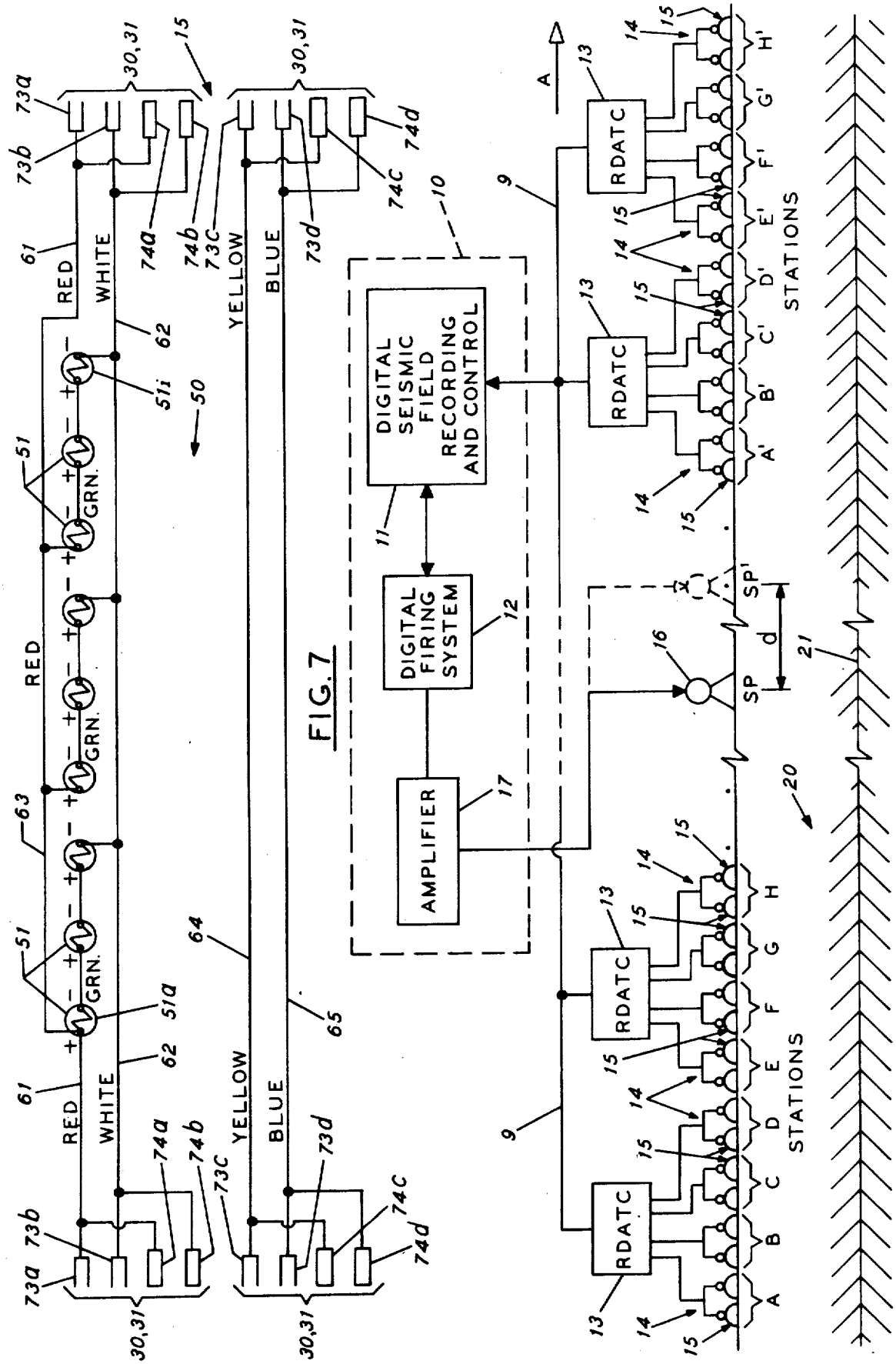

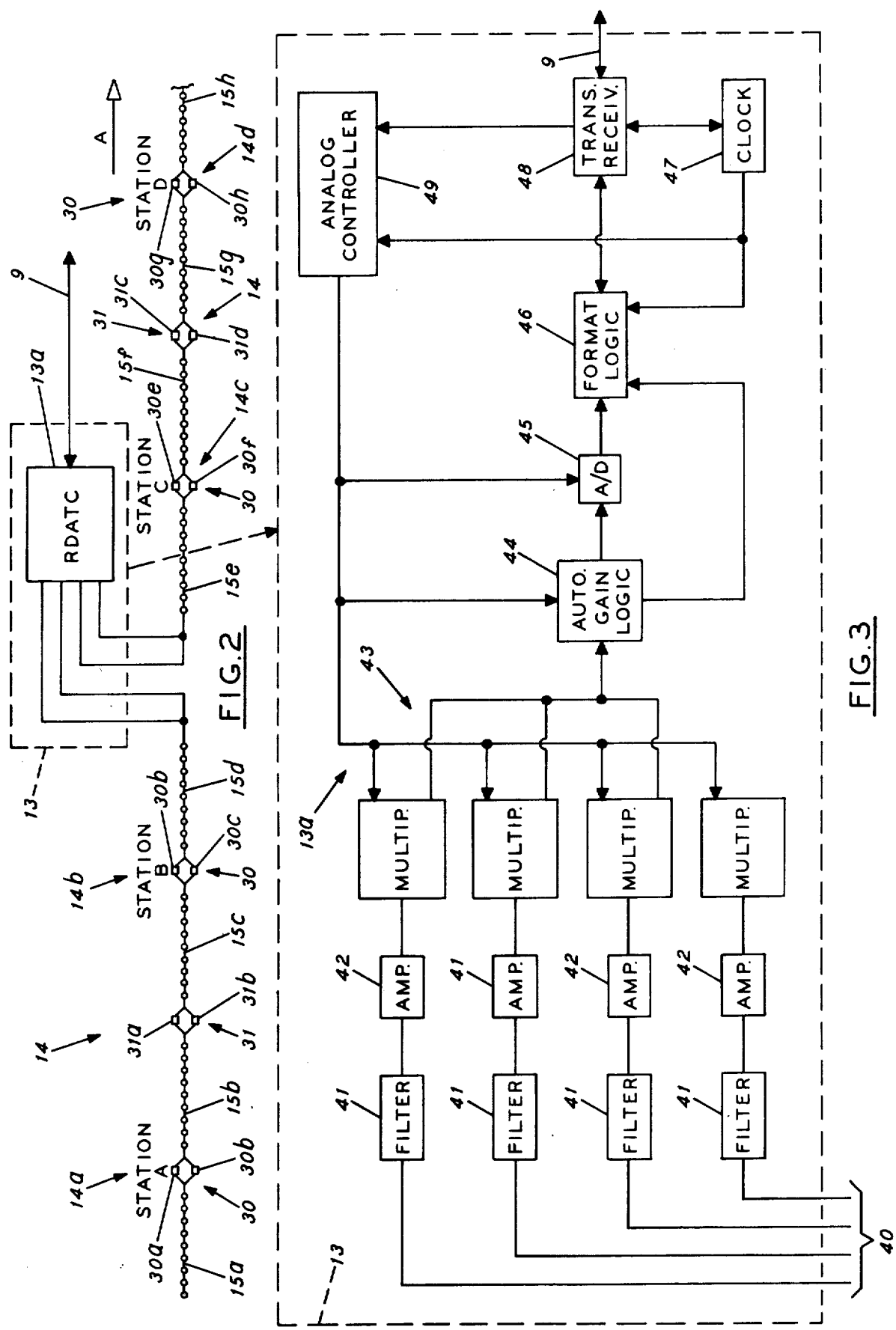

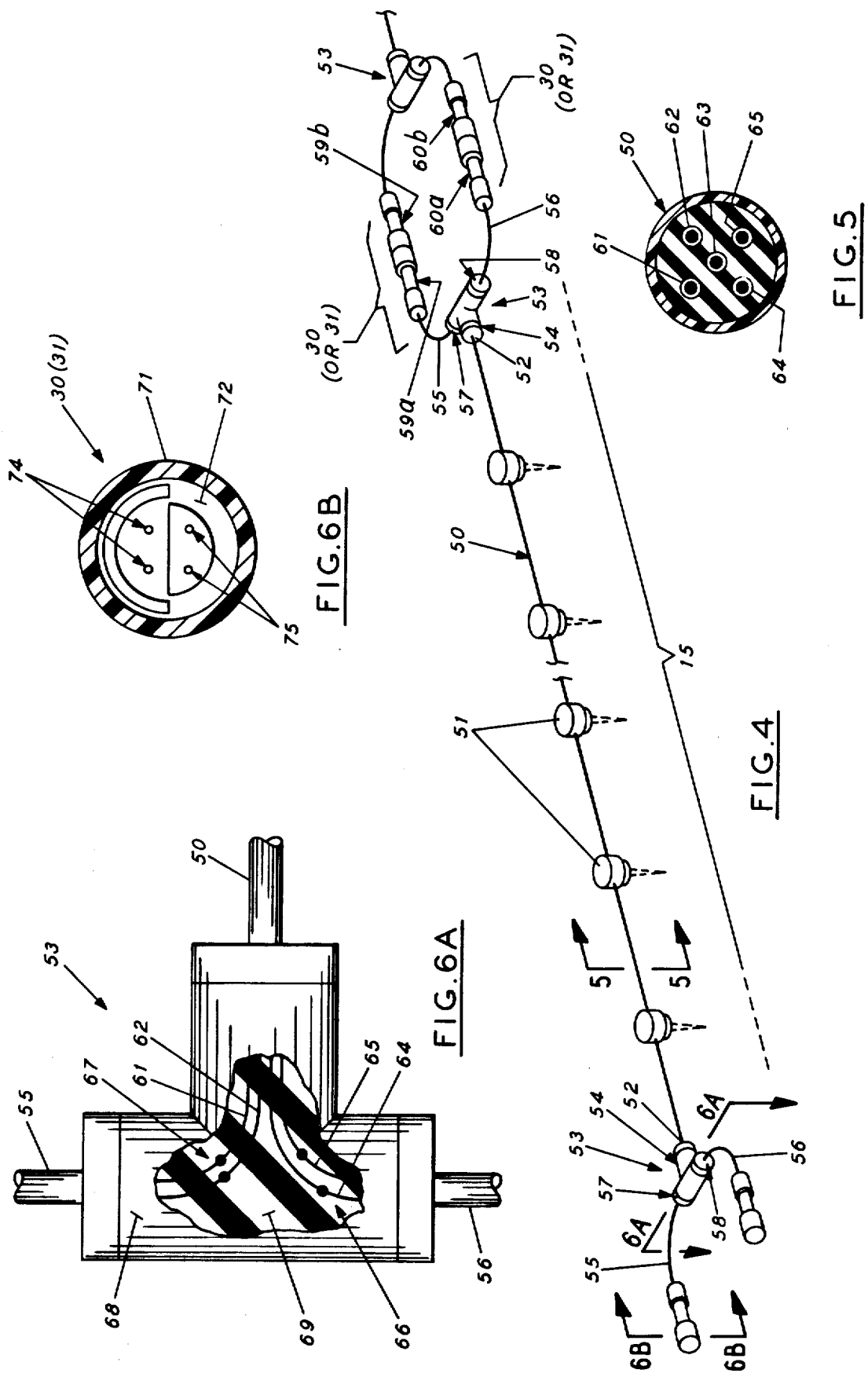

METHOD OF CONNECTING FLEXIBLE NUMBERS OF GEOPHONE FLYER GROUPS TO DATA ACQUISITION UNITS

RELATED APPLICATION INCORPORATED HEREIN BY REFERENCE

"Combination Jumper/Flyer And Method Of Manufacture Of Same In Which The Jumper/Flyer Is Associated With A Geophysical Data Acquisition System That Provides Digital Data In The Field Before Recording," R. F. Carter, Ser. No. 700,689, filed June 28, 1976.

FIELD OF THE INVENTION

In one aspect, this invention is directed to a method of utilizing combinations of flyer-jumpers associated with remote data acquisition and telemetering circuits (RDATC's) of more modern geophysical data acquisition systems for providing greatly simplified connection (and disconnection) of the plurality of geophones which make up each flyer in a variety of field settings, yet permit flexibility as to the number of phones per station permitted and allow changes in interval spacing per station with minimum helper mix-ups, as required.

SUMMARY OF THE INVENTION

The method and apparatus of the present invention are described in which connection (and disconnection) of a plurality of geophones associated with a series of stations of a digital seismic data acquisition system is greatly simplified without sacrificing flexibility as to the number of geophone flyers per station or the interval spacing per station and also without the addition of separate subcabling in the internal linkage of the flyer to the field digitizing equipment. The method utilizes a multiple-phone flyer-jumper connected to one channel of a series of channels of a remote data acquisition and telemetering circuit (RDATC). Each RDATC acts in combination with a group of geophone flyers, say 1, 2, 3, etc., to store, amplify, filter, gain control and digitize analog data from each group of flyers and then telemeter the data to recording circuitry in the field truck. Each flyer group can be flexibly made up of two, three, four or more flyer-jumpers; each flyer-jumper includes a central multi-conductor cable segment of say N+1 conductors, where N is an even positive number greater than two, terminating at each of its ends in the central leg of multi-armed connector. A plurality of series/parallel connected geophones, say 9 in number are used in combination with the central segment. At the ends of the arms of each multi-armed connector pass another conductor cable segment (similar to the central segment, but called the "branch cable segment") in which only two of the cables are actively connected to the selected conductor pairs of the central segment. At the other end of each branch cable is a hermaphroditic connector including a 2 male-2 female combination, with connection occurring between 1 male-1 female subunit by paralleling them electrically. In that way either (i) the three geophone conductors of the central cable segment can be flexibly connected to 1, 2, 3, etc., or more similarly located connectors of other flyer-jumpers to increase signal response of the resulting flyer group or (ii) the remaining conductor pair can be connected to outside circuits including the RDATC to actively transfer data of more remotely located geophones of adjacent flyers of interest. Repair to the flyer-jumper in the field is relatively simple. Of interest: each hermaphroditic connector is color coded to facilitate geophone flyer-jumper field setup and connection in a variety of arrangements with a minimum of helper mix up.

BACKGROUND OF THE INVENTION

In seismic exploration, generated acoustic waves are transmitted downward into the earth. At the transition zones between various types of rock strata, reflections of the acoustic waves occur; as attenuated parts of the wave are returned to the earth's surface they are detected by groups of planted geophones. Each geophone group provides a composite signal that is associated with a particular geographic station on the earth's surface. The signal can be the result of summing the outputs of any number of geophones. Usually, for ease of field use, minimum numbers of geophones, say nine, are semi-permanently fastened together to form a basic field group module. It is that module that is called a "flyer." Members of the field crew transport literally hundreds of these flyers into the field. At each of the stations, a member of the crew can electrically connect two or more of the flyers together to form a single channel of output data, that data being associated with a given geographical location in a patterned alignment with neighboring stations. After the acoustic source has been activated, the composite reflected signal from each of these stations say 48, is fed to electrical circuitry for recording and processing; this is called the basic 48 channel recording technique.

Several types of geophysical data acquisition systems for accomplishing the above are now available; for example, in a conventional system, the signal of each geophone group (station responses) is fed by a pair of conductors (along with signals on neighboring pairs of conductors) to the recording truck. Because the multiplicity of pair conductors within the seismic cable which may stretch for miles with at least 48 pairs not being uncommon, likelihood of breakdown can be rather high; and also cable impedance is rather high; signal response from individual geophone groups can likewise suffer in ways not easily detected at the recording truck, distortion being an example.

In another more modern system, to overcome the overuse of ultra-long conductor pairs within the seismic cable, a series of remote data acquisition and telemetering circuits (RDATC's) are positioned along the traverse of the geophone spread; these RDATC's gather data from a limited number of geophone flyers, then store, amplify, filter, gain control and digitize the analog data to a compatible digital format; the data bits are storable until a command releases them for transmission (telemetering) back to the central recording truck. That is, since each RDATC is capable of storing the digital information, interrogation and transmission to the central recording truck of that data can be in a series format. While RDATC's simplifies the recording of seismic data in a field to a substantial degree, nevertheless, in order to implement electrical connection of the multiplicity of geophone flyers to each RDATC, there may be a requirement of subcabling between both ends of the flyers and the input of the RDATC's.

Since each flyer can be relatively long, say 200 feet, the need for over 200–400 feet of subcabling per channel or 900 feet or more of subcabling per RDATC defeats one of the major field advantages of the use of intermediate RDATC's within a field system: simplification of the field set-up which links all RDATC's and the central recording truck. Also the use of many different geophone flyers connected by subcabling can lead to foul-ups revolving around the miselectrical connection of the RDATC's and the flyers by the field crew. E.g., the use of large numbers of subcables can lead to some flyers being connected in loops to each other and not to a RDATC. While some helper mix-ups are detectable at the central recording truck some are not; the ones that are, still require communication back from the truck to the "jug handlers" for correction prior to actual recording the seismic data. Hence, loss in crew efficiency occurs. Still yet, each RDATC includes amplifiers whose response can be different dependent on subcabling characteristics. Hence systematic handling of each input channel of data would be desirable.

OBJECT OF THE INVENTION

An object of the present invention is a provision of a novel method of providing a series of flyer groups for use with RDATC'S of a digital seismic telemetry data acquisition system in which each flyer provides connection of the geophones it comprises, in a greatly simplified manner without sacrificing flexibility in field set-up to generate the required seismic data or haphazardly affecting RDATC response.

Further objects, features and attributes of the present invention become apparent to those skilled in the art from a detailed reading of the following descriptions of preferred embodiments of the invention to be taken in conjunction with the accompanying drawings.

DESCRIPTION OF THE DRAWINGS

FIG. 1 is a functional block diagram illustrating the systematic digital collection and recordation of seismic field data in which a combination flyer-jumper of the present invention is effectively used for carrying out the method of the present invention, such flyer-jumper being employed with like flyers in combination with a plurality of remote data acquisition and telemetering circuits (RDATC's) to pass digitized data in a series format after collection to a central recording truck;

FIG. 2 is a schematic representation of the field collection and telemetry system of FIG. 1 in which eight seismic flyer-jumpers of the present invention are seen to be attached to a four-channel RDATC which in turn is connected to the central recording truck in which there is housed a digital seismic field collection and control circuit;

FIG. 3 is a block diagram of the RDATC of FIG. 2 in which elements of the RDATC are illustrated in detail;

FIG. 4 is an isometric perspective of the flyer-jumper of FIG. 2;

FIGS. 5, 6a and 6b are sections taken along lines 5—5, 6a—6a and 6b—6b, respectively of the flyer-jumper of FIG. 4; and FIG. 7 is a schematic diagram of the flyer-jumper of FIG. 4.

DETAILED DESCRIPTION OF SPECIFIC EMBODIMENTS

Attention should now be directed to FIG. 1 illustrating method and apparatus aspects of the present invention.

As shown, a digital field system is schematically indicated at 10. It is associated with a seismic data-gathering truck (not shown), the latter being movable in the direction of survey, say in the direction of arrow A. The field system 10 includes a digital field recording and control system 11 interconnected between a digital firing system 12 and a series of remote data acquisition and telemetering circuits 13 called "RDATC's." Each RDATC 13, in turn, is connected to several geophone flyer groups 14, say at least four per RDATC, each flyer group 14 being composed of two or more geophone flyers 15. The flyer groups 14 form a geophone spread which is usually 2 or more miles in length.

Digital firing system 12 controls a vibrator 16 or dynamite or any energy source located at the earth's surface or therebelow.

If a vibrator is used, it is preferably a hydraulic-type vibrator, such as provided in a Vibroseis system, a trademark of Continental Oil Company, and provides for the initiation of a control seismic energy signal through amplifiers 17 for transference into an earth formation 20 below the RDATC's 13 and flyer groups 14, say at a source point (SP). The acoustic wave front from the energy source inparted into the earth's formation 20 is in accordance with the predetermined variation (amplitude versus time) of a pilot signal obtained from digital firing system 12 in a conventional manner.

After the vibrator (or other energy source) has been initiated, a collection cycle occurs; during the first collection cycle, reflections of the seismic energy such as from discontinuity 21 are detected by the geophone spread, viz by geophone flyer groups 14 associated with geographic stations A, B, C, D, E, etc. The analogue output of each geophone flyer groups 14 (and hence stations A, B, C, D, E, etc.) is fed in turn to one of a series of RDATC's 13. Since the output of each flyer groups 14 is a single combined electrical signal, a separate channel of each RDATC 13 is used to receive the data.

Within the RDATC 13, each channel of data undergoes a series of operations, including digitization, formatization and storage until the time is ripe for the bits of information to be transmitted (telemetered) back to the recording truck, i.e. to control system 11. Since the data from all RDATC's 13 is storable, the information can be fed — on command — say, along a single two-conductor cable 9, in a series format to the digital field recording and control systems 11 where finalized recording on magnetic tape occurs. Of course, instead of cable 9, other means could be used to transfer the data from each RDATC to the control system 11, say, via a radio link, if desired.

After the vibrator 16 (or any other energy source) has operated at source point (SP), the vibrator 16 (or other energy source) as well as portions of the geophone spread, i.e., flyer groups 14 associated with say station A may be displaced in new positions in the direction of arrow A.

Assume the vibrator (or other source) is located in new source point (SP') displaced in the direction of arrow A an inline distance ($d$) from its previous location (SP). The geophone spread can be advanced the same inline distance ($d$), say where $d$ is equal to the total length of a flyer group that comprise a given station. At that time, a new collection cycle begins in the manner previously described.

Of course, the geophone spread of FIG. 1 can comprise a great number of geophone flyer groups 14 depending inter alia, on the number of active RDATC's that are used in the field as well as on the sampling rate used at each RDATC. Since the channel capacities of the RDATC's are additive, as many as 384 channels of information can be recorded at the digital field recording and control system 11. But conventionally about 28 RDATC's are used in one field arrangement; assuming a sampling rate of roughly 4 milliseconds allows about 112 channels of data to be easily processable; but only about 96 are selected for seismic recording; the remainder, about 16 channels are usually used for documentational purposes.

For 48 channel recording, the number of RDATC's required is proportionately lower as is the length of the spread, viz, 14 RDATC's at a sampling rate of 4 milliseconds provide 56 channels of data, with eight such channels being used for documentation of the operation. If each station comprising geophone flyer group 14 is composed of two flyers 15 of 200 feet length each, then the spread length per collection cycle would be about 2½ miles. Using roll along techniques, as previously mentioned, the "break up" of seismic flyers associated with a particular station can occur electrically so as to allow the spread to be moved in the direction of the arrow A. Hence how effectively the flyers 15 can be connected (and disconnected) is important to efficient field operations.

FIG. 2 illustrates flyer groups 14 in more detail, and in particular, in connection with stations A, B, C and D and RDATC 13a.

As shown, station A is seen to be associated with flyer group 14a viz, flyers 15a and 15b. Similarly, station B is associated with the flyer group 14b composed of flyer pair 15c and 15d; while station C is associated with flyer group 14c comprising flyers 15e and 15f. Finally, station D is associated with flyer group 14d consisting of flyer pair 15g and 15h.

Flyers of each pair, i.e. flyers 15a, 15b; ... 15g, 15h are electrically joined at a series of central connectors 30 between them; i.e. each of the connectors 30 includes separate pairs of connectors 30a, 30b, 30c, 30d, 30e, 30f, 30g and 30h formed at the point of electrical connection of each of the flyer pairs. Note also that each central connector 30 is coincidentally located with the composite geographical position associated with each respective station A, B, C, D, E ... etc., depicted in FIG. 2.

Additionally, between each adjacent pairs of stations, i.e. between stations A, B and C, D is a second series of electrical connectors 31 for the flyers, viz, paired connectors 31a, 31b and 31c, 31d.

Although mechanically, connectors 30 and 31 are similar, electrically each is independent of the other. That is to say, the main function of connector 30 is to sum the electrical signal output of each flyer pair of each geophone group 14a, 14b ... 14d of FIG. 2, while the other connectors 31 main function is to isolate the signal outputs from adjacent flyer groups but still allows the output signal from the more remote flyer groups i.e. flyer groups 14a and 14d to gain entry to the more near flyer groups 14b and 14c, respectively for eventually feeding to the RDATC 13a.

FIG. 3 illustrates RDATC 13a in still more detail.

As shown, RDATC 13a includes a series of input channels 40. Each of the channel 40 discretely connects to an output of flyer groups 14a, 14b ... 14d. The signal output from the above-mentioned flyer groups first passes from a channel 40 through filter 41, amplifier 42 to multiplexer network 43. Within the multiplexer network 43, the seismic data received at each flyer groups almost instantaneously is multiplexed and passes through gain logic circuit 44 to A/D convertor 45. The function of the former is to make sure the date at A/D convertor 45 is within its processing capability. Within the A/D convertor 45, the analogue information is converted to a digital value after which it passes to format logic circuit 46.

Note that format logic circuit 46 is controlled through a master clock circuit 47. The latter receives a control signal from the digital seismic recording and control system 11 of FIG. 1; such signal passes through transmit/receive circuit 48 to the circuit 47 to either start/stop operations as well as pace the operations of the associated circuits. In regard to the latter, note that clock circuit 47 is also associated with operation of analogue control circuit 49 connected to not only A/D convertor 45 but also to gain logic circuit 44 and multiplexer network 43. In this way, data passing through multiplexer network 43, gain logic circuit 44 and A/D convertor 45 does so on a controlled pace basis so that the data length at format logic circuit 46 is correct.

The format logic circuit 46 includes a series of registers, not shown. Within these registers, the seismic information associated with each of the stations A, B ... D is stored. But such data is subject to being called — on command — to the digital recording and control system 11 of FIG. 1, as previously mentioned. All such signals are exact multiples of the signals at clock circuit 47. So read-out of the data within format logic circuit 46 is accomplished at specific intervals of time that are exact multiples of the clock pulse, once a start/send signal has been received at the RDATC 13a.

Note in FIG. 3 that the combination output/input of transmit/receive circuit 48 is the single two-conductor cable 9 of FIGS. 1 and 2. Each flyer group 14 comprising the flyer groups 14a, 14b, 14c and 14d, must be properly connected in both mechanical and electrical senses to insure proper flyer and system operation. Hence mechanical and electrical construction of each flyer 15 is of importance.

FIG. 4 illustrates the mechanical and electrical aspects of the combination flyer-jumper 15 of the present invention in detail.

As shown, each flyer-jumper 15 includes a central cable segment 50 which electrically connect to selected number of geophones 51, which as previously mentioned is usually nine in number. At end 52 of the cable segment 50 is a T-junction 53. The mechanical construction of the T-junction 53 is clear: it has a T-junction housing formed of plastic material for protection of separate soldered joints (not shown) therewithin from the outside environment. It includes a base leg 54 into which the control cable segment 50 projects for juncture with branch cable segments 55 and 56 which enter through diametrically opposed arms 57 and 58, respectively.

At the ends of the branch cable segments 55 and 56 are half-connectors 59a, 60a which engage like constructed pairs 59b, 60b (at least at one end) to form the connectors 30 (or 31) to connect the flyers 15 to outside circuits or to each other when paralleling flyers. Of primary importance of course is the signal output provided by the geophones 51 connected within the cable segment 50. That signal should be maximized, if possible, and the electrical connection of the geophone 51 within the central segment 50 may be of interest.

FIGS. 5 and 7 illustrate the electrical connection of geophones of a flyer 15. In this regard note that the central segment 50 includes five conductors divided into two separate sets:

Group I includes conductors 61, 62 and 63 for connection of the geophones 51 while Group II includes conductors 64, 65 which are used to conduct data from the adjacent flyer group to one of the channels of the RDATC 13 of FIG. 1 as explained in more detail below.

Returning to the conductors 61, 62 and 63, note that purpose of the conductors is to provide a signal output of maximum amplitude from the geophones 51. For this purpose the geophones 51 are connected in a rather unique way: three sets of geophones are first formed as indicated in FIG. 7, these sets being connected in parallel; but within each group are formed three separate geophones in series with each other. Hence there is a need to have at least the 61, 62 and 63 conductors within the central segment 50, although it should be noted that beyond the lead and lag geophones 51(a) and 51(i), respectively, only two conductors 61 and 62 are "active" in conduction of the signal generated by the geophones 51(a) . . . 51(i), to outside circuits through the T-junction terminals 53 and the outside connectors 30, 31 of FIGS. 2 and 4.

FIGS. 6a and 6b illustrate the T-terminal 53 and connectors 30 (or 31) in still more detail.

As shown in FIG. 6a, four separate soldered joints are formed within T-connector 53; one pair of joints 66 connects branch cabling segment 55 to the conductors 64 and 65; the other pair of joints 67 connects the active conductors 61 and 62 internally associated with the geophones 51(a) . . . 51(i) to the branch cabling segment 55. Since the T-junction connector 53 includes both a hard plastic exterior 68 and a pliable rubber interior housing 69, the pairs of joints 66 and 67 are protected from external damage.

As shown in FIG. 4, far ends of the branch cable segments 55 and 56 terminate in hermaphroditic connector pairs 30 (or 31) of the non-polarized type. Note that the connectors 30 (or 31) are the same electrically and almost the same mechanically with respect to each other, except for color; the housings of half-connector pair 59a, 59b, for example, associated with the active conductors 61, 62 to form a connector pair 30 are colored alike (orange); the housings of half-connector pair 60a, 60b for by-passing data on conductors 64, 65, are likewise of the same color (white). But when the half-connector pairs form a connector pair 31, each of the latter is bi-colored (½ orange-½ white).

Note that each of the half-connector pairs 59a, 59b, 60a and 60b of FIG. 4 has a common construction as shown in FIG. 6b.

Each includes a permanent housing 71, an insulated base 71, female recepticles 73, and male prongs 74. The latter elements are connected to conductors 61, 62 or 64, 65 in the manner previously mentioned with reference to FIG. 7. But since there is a formed male-female combination of connecting elements, i.e. electrically connected in parallel, the above conductors 61, 62, 64 or 65 can be easily connected in separate operating modes. That is, e.g., in FIG. 7, conductor 61 can be connected via tube 73a or prong 74a; conductor 62 can be connected via tube 73b or prong 74b; conductor 64 can be connected via tube 73c or prong 74c; and finally, conductor 65 can be connected via tube 73d or prong 74d. The result: each connector 30, 31 has greater flexibility as to its manner of connection yet mix ups in field operation are avoided.

For example, returning to FIG. 2, station A relates to the employment of flyers 15a and 15b which combine the signals of their geophones into a single output. For such operation, the connector 30a is electrically associated with the separate flyers 15a and 15b. Since the connector 30a always relates to combining of geophone signals, the housings of the connector 30a are of a like color, say orange, as shown in FIG. 7. (Of course, the remaining connector 30b carries no signal and need not be connected but for purposes of avoiding crew error, they always are.) In that way, the output of the flyers 15a and 15b, of the group 14a would be combined so that a summed signal response would appear at connector 31a mid-way between stations A and B. Although mechanically connector 31a looks just like connector 30a, it has a bi-colored arrangement in its connected arrangement; i.e. one housing of each connector pair, is one color (orange) and the other a different color (white). The remaining connector 31b has a similar color designation, since it is also associated with the by-pass mode of operation, i.e. with the conductors 64, 65 of FIG. 6a. Thus, the output of flyer groups 14a, i.e. flyers 15a and 15b, can be fed through the more-near flyer group 14b eventually to RDATC 13a. Of course, a like pattern of connection occurs between and among flyer groups 14c and 14d in the like manner previously described.

It should be further realized that if each RDATC had six channels rather than four, that the number of conductors comprising the cental cable segment 50 of FIG. 4 could be increased, that is say to a value of seven conductors; also instead of two bi-color terminals there would be three color coded connector pairs 30 (or 31) at each end of each flyer 15 of FIG. 2. But of course, three separate seismic receiving stations, say stations A, B, C, and D, E and F would be positioned on each side of each RDATC would be used, the criteria being that the same color code combination would be used to combine signal output or to pass data on-through more near flyer groups.

It should be also evident that the cable segment 50 of FIG. 4 as well branch cable segments 55 and 56 can be composed of five-conductors. Of course, each conductors would have an outer sheath color coded in accordance with a set form, such as shown in FIG. 7; hence assembly and interconnection of the geophones and connectors 30, 31 as well as T-connector terminals 53 would be simplified with little likelihood of mix up. And even though the branch cabling segments 55, 56 require only two conductors, a five-conductor cable is often used to simplify purchasing and assembly requirements.

All specific embodiments of the invention have been described in detail, and it should be understood that the invention is not limited thereto as many variations will be readily apparent to those skilled in the art. E.g. assume each RDATC accepts several channels of information. Each central cable segment 50 would contain N+1 conductors, where N is any even positive number greater than two such as four, six, etc., and terminal 53 at each end of the central segment 50 would contain N/2 output arms (but only a single input leg) a similar number of branch cable segments N/2 would exit from each terminal 53 and connect with a like number of connectors 30, 31 having N/2-color codes per end. Also to provide a number of flyer groups, say of C flyer-jumpers (where C is any whole number greater than zero), all that needs to be done is to lay out the C flyer-jumpers; between each adjacent flyer-jumper of any flyer group, connection of like-color coded connectors 30 is made, which provides a numeral signal output at connectors 31; at connectors 31, un-alike color-coded connectors are joined in a pattern that is repeated up- and down-survey of the spread until connection at the input channels of ech RDATC occurs. Thus, the invention is to be given the broadest possible interpretation within the terms of the following claims.

What is claimed is:

1. A method of providing a series of flyer groups made up of selected but flexible numbers of geophone flyers per group connected to a remote data acquisition and telemetering circuit (RDATC) equipped to receive a number of channels of information simultaneously comprising the steps of:

1. laying out a series of C flyer-jumpers where C is any whole positive number equal to the number of flyer-jumpers selected per group, and where each of said series of flyer-jumper comprises a central geophone cable segment including N+1 conductors where N is any even positive number greater than two and a series of interconnected geophones therein; a plurality of N/2 branch cable segments connected at each end of certain of said N+1 conductors of said central cable segment; and a series of N/2 hermaphroditic connectors connected to said plurality of N/2 branch cable segments, each of said hermaphroditic connectors having an outer housing, but matched at the opposite end to a like colored and similarly electrically connected connector, whereby at least one paired, like color-coded set of connectors electrically connect to said geophones and at least another pair of like color-coded set of connectors electrically connected to certain N+1 conductors which are electrically isolated from said geophones, said at least another set of connectors having color codes that are distinct from that of said one set of connectors;

2. between each adjacent flyer-jumpers of any C serially arranged flyer-jumpers, connecting like-colored hermaphroditic connectors together to form a geophone flyer group, providing at least a summed signal output per group at an output end thereof; and 3. at said output end of each flyer group, connecting un-alike color-coded hermaphroditic connectors in a pattern repeated up-survey and down-survey toward said RDATC where final connection is provided to provide input channel information to said RDATC.

2. The method of claim 1 in which N is equal to 4 and C is 2.

3. The flyer-jumper of claim 1 in which N is equal to 6 and C is 2.

4. The method of claim 1 in which each of said hermaphroditic connectors has an outer housing of a color selected from N/2 possible color codes.

* * * * *